Nov. 19, 1935.  W. OWEN  2,021,198

MACHINE FOR EDGING GLASS SHEETS

Filed Feb. 23, 1935  2 Sheets-Sheet 2

INVENTOR.
WILLIAM OWEN
BY Bradley + Bee
ATTORNEYS.

Patented Nov. 19, 1935

2,021,198

UNITED STATES PATENT OFFICE 2,021,198

MACHINE FOR EDGING GLASS SHEETS

William Owen, Pittsburgh, Pa., assignor to Pittsburgh Plate Glass Company, a corporation of Pennsylvania Application February 23, 1935, Serial No. 7,824

6 Claims. (Cl. 51—103)

Figure 1:
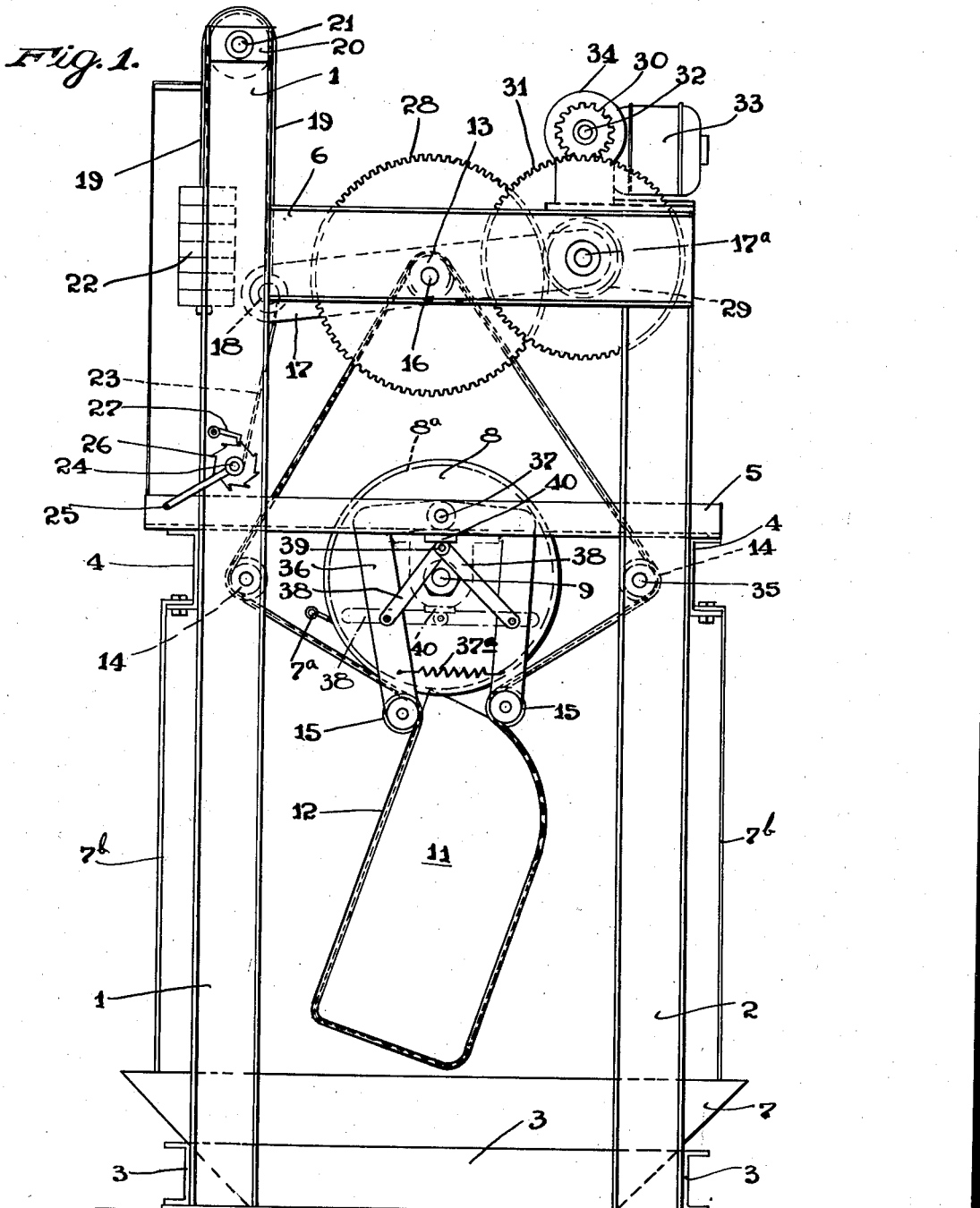
Figure 2:
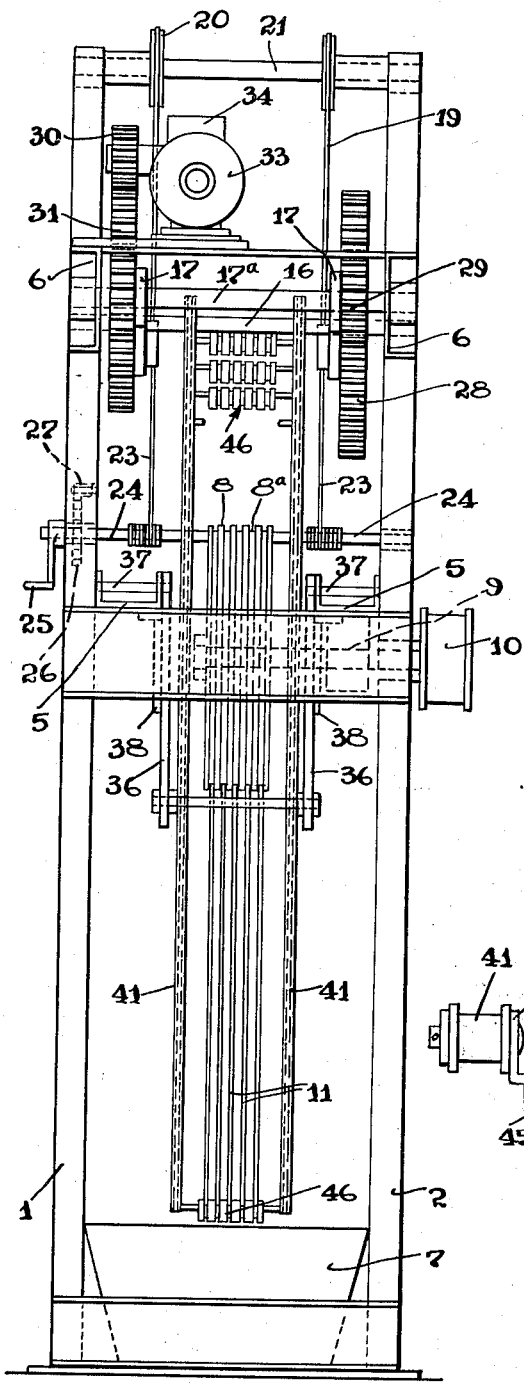
Figure 3:
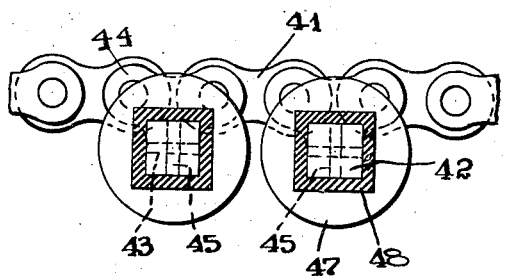
Figure 4:
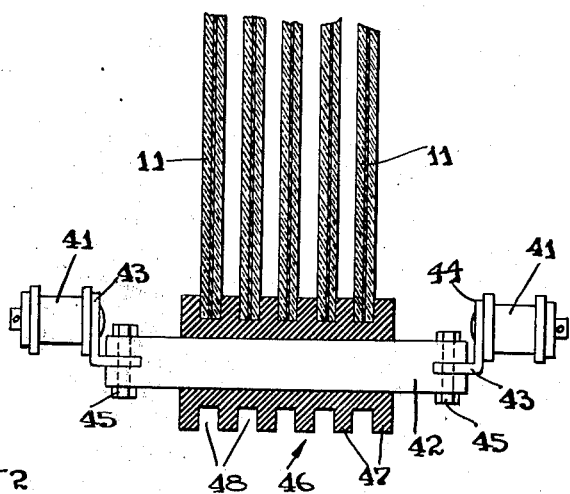

The invention relates to apparatus for grinding the edges of glass sheets, ordinarily to give them the half round or pencil edge required for automobile glass. The invention is illustrated as applied to plates of safety glass which consist of two thin sheets of glass cemented to an interposed reinforcing sheet of celluloid or the like, but the machine is equally well adapted for grinding the edges of sheets of ordinary plate glass, and for edging sheets designed for service other than as automobile glass. The invention has for its principal objects the provision of an improved machine which will grind all the edges of the sheets at uniform grinding speed regardless of their contour and will handle curved sides and rounded corners as well as straight sides, and which will perform this function without manipulation or attention on the part of the operator in the interval between the placing of the sheets in the machine and their removal therefrom. A further object is the provision of a machine of simple, compact form, which will handle a large amount of work with a minimum amount of effort on the part of the operator, permitting him to attend to a number of machines at one time. One embodiment of the invention is illustrated in the accompanying drawings, wherein:

Figure 1 is a side elevation of the machine. Fig. 2 is an end elevation. And Figs. 3 and 4 are enlarged detail views showing the chain belt construction.

Referring to the drawings, the framework of the machine consists of four uprights, 1, 1 and 2, 2, preferably commercial channels tied together by other channels 3, 4, 5 and 6, and carrying at its base a pan 7 for receiving the water supplied from the nozzle 7a as it drains from the glass sheets as the edging operation progresses. Splash curtains 7b at the sides of the frame prevent the water supplied to the wheel from being thrown outside the pan. Mounted for rotation in the frame upon the bearings supported from the channels 5, 5 is the grinding wheel 8, the axle 9 being provided with a pulley 10 by which the wheel is rotated from power mechanism (not shown) at a suitable grinding speed. The wheel is provided with edge grooves 8a for giving the glass sheets the desired half round contour, and as shown, five grooves are employed so that the five plates may be edged at each operation. This number of grooves may be increased or decreased depending upon requirements. The glass sheets 11 to be edged are supported in a loop 12 formed by an endless chain belt whose construction is later described in detail. The two chains which are employed in this belt pass around the pairs of sprockets 13, 13, 14, 14 and 15, 15. The sprockets 13, 13 are the ones which are driven, the other sprockets acting as idlers and such sprockets are disposed, as indicated in Fig. 1, so that the belt encloses the grinding wheel and carries the glass sheets in the loop 12 beneath such wheel. The sprockets 13, 13 are mounted upon a shaft 16 journalled at its ends in a pair of arms 17 which are pivoted upon the shaft 17a, the latter shaft being carried by suitable bearings mounted upon the frame of the machine. The left hand ends of these arms are provided with pins 18 to which are connected a pair of cables 19 extending over pulleys 20 mounted upon a shaft 21 at the upper end of the channels 1, 1. The other ends of these cables carry the counterweights 22, so that in the operation of the machine, the construction just described serves to tension the chain belt and pull the loop 12 upward causing the glass sheets carried thereby to engage the grooves of the grinding wheel with the desired amount of pressure. In order to produce slack in the chain belt at the end of the grinding operation to permit of the removal of the glass plates 11 and their replacement by other plates, means are provided for pulling the ends of the arms 17, 17 downward and moving the counterweights upward. This is accomplished by means of the cables 23 attached to the pins 18 and wound around drums on the shaft 24. This shaft is provided with a handle 25 and with a ratchet 26 which is adapted to be engaged by the pawl 27.

The shaft 16 carries a spur gear 28 which is driven by a pinion 29 on the shaft 17a, and the shaft 17a is in turn driven from a pinion 30 which engages a spur gear 31 keyed to the shaft 17a. The shaft 32 which carries the pinion 30 is driven from the electric motor 33 through the intermediary of reduction gearing in the casing 34.

The pairs of sprockets 14 are mounted on shafts 35, 35 journalled in bearings carried by uprights 1, 1 and 2, 2. The pairs of sprockets 15, 15 are carried by the pairs of arms 36, 36 which are pivoted upon a shaft 37 carried by the framework and are yieldingly pulled toward each other in the operation of the machine by means of the spring 37a. These sprockets 15, 15 function to cause the chain belt to follow the contour of the glass plates supported in the loop 12, and make it certain that the glass plates can not escape accidentally in a lateral direction from the belt. They also serve to increase the traction of the belt upon the edges of the glass sheets, so that during the grinding operation the sheets are caused to move with the belt at the same speed as such belt. This action serves to bring all portions of the edges of the sheets over the grinding wheel, and such movement is at a uniform speed throughout the edging operation since the lineal speed of movement of the edges of the glass plates is the same as that of the belt.

In removing one set of glass plates and inserting another set, it is necessary to separate the arms 36, 36, and in order to accomplish this result, the toggle links 38, 38 are employed pivoted at their lower ends to the arms 36, 36 and having a common pivot 39 at their other ends. A plate 40 is carried by the pivot 39, and in separating the arms 36, 36, this plate is used as a handle and the pivot 39 is lowered until the links 38, 38 are in line, as shown in dotted lines, at which time the plate 40 rests upon the tops of the links and prevents their further downward movement. This device serves to maintain the pairs of sprockets 15, 15 in separated relation during the removal of plates from the loop 12 of the belt and the substitution of other plates in such loop. The chain belt construction as shown in Figs. 3 and 4 comprises a pair of sprocket chains 41 connected at short intervals by transverse bars 42. These bars are preferably square, as indicated at Fig. 3, and are slotted at their ends to receive the clips 43 carried by the inner side links 44 of the chains. Bolts 45 extend through the ends of the bars 42 and the ends of the clips 43, thus holding the parts in assembled relation. Molded on the bars 42 are the spacing and edge holding members 46, preferably of rubber composition and consisting of the series of flanges 47 with the grooves 48 therebetween which are of a width corresponding to the thickness of the glass plates 11. The plates 11 in this case are shown as safety glass, and each consists of a pair of sheets of plate glass with an interposed sheet of celluloid, or other similar material, cemented to the glass sheets.

In loading the machine, the crank arm 25 is operated to lower the arms 17 and provide the necessary slack in the loop 12. At such time, the arms 36, 36 are separated by means of the toggle links 38, 38, thus providing space for the convenient loading of the loop 12 of the belt. A set of five similar plates are then positioned in the loop with their edges in the grooves 48 of the spacing members 46, and the toggle links 38 are moved upward so that the spring 37a pulls the sprocket 15 to the position shown in Fig. 1. This is followed by the release of the pawl 27 so that the counterweights 22 cause the arm 17 to move upward and thus tension the chain and pull the set of sheets 11 upward so that they engage the edge of the grinding wheel with the necessary pressure for proper grinding. At this time the grinding wheel is being driven at normal speed and the belt is also being driven from the motor 33, the speed of the motor being such as to give the glass plates the necessary edging speed, which will vary, but which for the purpose of example may be stated to be about five inches per minute. The grinding operation is continued until the plates have been turned through an angle of 360 degrees, thus edging the plates throughout their peripheries. This completes the grinding operation and the plates are removed by separating the arms 36, 36 and pulling the arms 17 downward, as heretofore described, to give the necessary slack in the loop which carries the glass plates so that they may be removed and replaced by another set of glass plates.

What I claim is:

1. A glass plate edging machine, comprising an endless driven belt lying in a vertical plane, a driven grooved grinding wheel lying within the confines of the belt and rotating in the same vertical plane, said belt forming a loop beneath the wheel adapted to support the glass plate to be edged and being provided on its inner side throughout its length with flanges adapted to hold the plate in a vertical plane, means above the grinding wheel for yieldingly pulling the belt upward to tension it and bring the plate carried by said loop against the grinding wheel, and means applying pressure to the belt flights immediately below the grinding wheel to maintain such flights in contact with the upper edge portions of the glass plates.

2. A glass plate edging machine comprising an endless driven belt lying in a vertical plane, a driven grooved grinding wheel lying within the confines of the belt and rotating in the same vertical plane, said belt forming a loop beneath the wheel adapted to support the glass plate to be edged and being provided on its inner side throughout its length with flanges adapted to hold the plate in a vertical plane, a pulley above the grinding wheel over which the belt passes, means applying constant upwardly directed force to the pulley so as to tension the belt and yieldingly force the plate carried by said loop against the grinding wheel, and idler pulleys just below the grinding wheel engaging the outer sides of the belt and yieldingly pressed toward each other so as to maintain the belt flights in contact with the upper edge portions of the glass plate.

3. A glass plate edging machine comprising an endless driven belt lying in a vertical plane, and consisting of a pair of spaced chains connected by a series of spaced bars, a driven grooved grinding wheel lying within the confines of the belt and rotating in the same vertical plane, said belt forming a loop beneath the grinding wheel adapted to support the glass sheet to be edged, a block on each of said bars provided with a pair of flanges adapted to receive between them the edge of the glass plate, a pair of sprockets above the grinding wheel over which the chains of the belt pass, means for applying constant upward force to the sprockets so as to tension the belt and yieldingly force the glass plate carried by said loop against the grinding wheel, and idler sprockets just below the grinding wheel engaging the outer sides of the belt and yieldingly pressed toward each other so as to maintain the belt flights in contact with the upper portion of the glass plate.

4. A glass plate edging machine comprising an endless driven belt lying in a vertical plane, a driven grooved grinding wheel lying within the confines of the belt and rotating in the same vertical plane, said belt forming a loop beneath the wheel adapted to support the glass plate to be edged and being provided on its inner side throughout its length with flanges adapted to hold the plate in a vertical plane, means above the grinding wheel for yieldingly pulling the belt upward to tension it and bring the plate carried by said loop against the grinding wheel, idlers at the sides of the grinding wheel over which the belt passes, and means applying yielding pressure to the belt flights immediately below the grinding wheel to maintain such flights in contact with the upper edge portions of the glass plate.

5. A glass plate edging machine comprising an endless driven belt lying in a vertical plane, a driven grooved grinding wheel lying within the confines of the belt and rotating in the same vertical plane, said belt forming a loop beneath the wheel adapted to support the glass plate to be edged and being provided on its inner side throughout its length with flanges adapted to hold the plate in a vertical plane, a pulley above the grinding wheel over which the belt passes, means applying constant upwardly directed force to the pulley so as to tension the belt and yieldingly force the plate carried by said loop against the grinding wheel, idler pulleys at the sides of the grinding wheel over which the belt passes, and idler pulleys just below the grinding wheel engaging the outer sides of the belt and yieldingly pressed toward each other so as to maintain the belt flights in contact with the upper edge portions of the glass plate.

6. A glass plate edging machine comprising an endless driven belt, a driven grooved grinding wheel lying in the same plane as the belt, said belt being provided with a loop partially surrounding the glass plate to be edged and means for tensioning the belt so that the plate carried by the loop is maintained in engagement with the wheel with a constant grinding pressure, the belt being provided with flanges lying on each side of the plate for holding it in the plane of rotation of the wheel.

WILLIAM OWEN.